United States Patent [19]

Honjoh

[11] Patent Number: 4,839,758

[45] Date of Patent: Jun. 13, 1989

[54] MAGNETIC DISK CARTRIDGE LOADING-AND-UNLOADING DEVICE

[75] Inventor: Akira Honjoh, Tokyo, Japan

[73] Assignee: Fuji Photo Film Co., Ltd., Kanagawa, Japan

[21] Appl. No.: 940,373

[22] Filed: Dec. 11, 1986

[30] Foreign Application Priority Data

Dec. 11, 1985 [JP] Japan ................... 60-278185

[51] Int. Cl.$^4$ .............. G11B 15/68; G11B 31/00
[52] U.S. Cl. ............................ 360/99.06; 360/69; 360/71; 360/92; 369/34
[58] Field of Search .............. 369/34, 36, 38, 39, 369/178–180, 191, 192, 201; 360/69, 71, 92, 98; 414/277, 280–282, 273, 274, 331

[56] References Cited

U.S. PATENT DOCUMENTS

| 3,297,379 | 1/1967 | Artaud et al. ............... 414/273 X |
| 4,504,936 | 3/1985 | Faber et al. ...................... 369/34 |
| 4,527,262 | 7/1985 | Manto ........................ 369/39 X |
| 4,607,354 | 8/1986 | Ishibashi et al. ................. 369/39 |
| 4,644,425 | 2/1987 | Tamaki .......................... 360/69 |
| 4,654,727 | 3/1987 | Blum et al. ..................... 360/71 |

FOREIGN PATENT DOCUMENTS 57-92459  6/1982  Japan ...................... 360/92

Primary Examiner—John H. Wolff
Attorney, Agent, or Firm—Sughrue, Mion, Zinn, Macpeak & Seas

[57] ABSTRACT

A magnetic disk cartridge loading-and-unloading device for loading a magnetic recording disk cartridge into a recording and reproducing system and unloading it from the recording and reproducing system comprises a movable member, first and second holding members which are adapted to grasp the magnetic recording disk and are mounted on the movable member near to each other to be moved together with the movable member and a controller which controls the movable member and the first and second holding members. Under the control of the controller, the movable member brings the first holding member to a position in which the first holding member grasps a first magnetic disk cartridge supplied by a supply conveyor, then brings the second holding member to a position in which the second holding member grasps a second magnetic disk cartridge ejected from the recording and reproducing system with the first holding member holding the first magnetic disk cartridge, then brings the first holding member to a position in which the first holding member loads the first magnetic disk cartridge in the recording and reproducing system with the second holding member holding the second magnetic disk cartridge, and brings the second holding member to a position in which the second holding member delivers the second magnetic disk cartridge to a discharge conveyor.

2 Claims, 2 Drawing Sheets

MAGNETIC DISK CARTRIDGE LOADING-AND-UNLOADING DEVICE

BACKGROUND OF THE INVENTION

1. Field of the Invention

This invention relates to a magnetic disk cartridge loading-and-unloading device, and more particularly to a magnetic disk cartridge loading-and-unloading device which loads a magnetic disk cartridge in a recording and reproducing system (In this specification, the term "recording and reproducing system" should be broadly interpreted to include a system for recording only and a system for reproduction only.) and unloads the magnetic disk cartridge from the recording and reproducing system after the cartridge is subjected to a predetermined process in the system.

2. Description of the Prior Art

There have heretofore been provided floppy disks consisting of a flexible base of polyester sheet or the like on each side of which is formed a magnetic layer on which information is magnetically recorded by means of a magnetic head while the disk is rotated at high speed. Because they are easy to handle and are low in cost, such floppy disks are widely used as recording media for computers. These advantages of floppy disks and the fact that they can be reused, which is not possible with silver-halide photographic film, have led to such floppy disks being provided in a smaller form as the image recording media in electric still cameras. For such cameras, the disk is used via a magnetic disk cartridge consisting of a hard casing, within which is rotatably housed the disk.

During production of such magnetic disk cartridges, completed cartridges are generally loaded in a recording and reproducing system in order to check their magnetic layers. In the case of cartridges for specified use, the cartridges are often subjected to a predetermined copying process such as initialization. In such cases, it is preferred that the cartridge be taken out from the recording and reproducing system as soon as the predetermined process is completed and another cartridge be loaded in the system as soon as the preceding cartridge is unloaded, thereby improving the operating efficiency of the recording and reproducing system.

There have been provided various automatic magnetic disk cartridge loading-and-unloading devices for this purpose. Many of the conventional devices essentially comprise, as shown in FIG. 3, a movable member 111 which is movable to a cartridge supply position, a recording and reproducing system and a cartridge discharge position, and a cartridge holding means 110 mounted on the movable member 111. After the cartridge holding means 110 grasps a magnetic disk cartridge 113 at the cartridge supply position, which may be constituted as a supply conveyor 112, the movable member 111 is moved to the recording and reproducing system 114 with the cartridge holding means 110 holding the cartridge 113. Then the cartridge 113 is loaded in the system 114. After the cartridge 113 is subjected to a predetermined process in the recording and reproducing system 114, the cartridge holding means 110 again grasps the cartridge 113 and the movable member 111 moves to the cartridge discharge position, which may be constituted as a discharge conveyor 115, carrying the cartridge 113. The movable member 111 is moved among the cartridge supply position, the recording and reproducing system and the cartridge discharge position (up and down as seen in FIG. 3) by a ball screw 116 rotated in forward and reverse directions by an electric motor 118, and the cartridge holding means 110 is moved rightward and leftward by an air cylinder 117. That is, the holding means 110 is moved leftward to grasp the cartridge 113 on the supply conveyor 112, and then moved rightward, and thereafter, the movable member 111 is moved to a position opposing to the recording and reproducing system 114. Subsequently, the holding means 110 is moved leftward with the cartridge 113 and causes the cartridge 113 to be loaded in the recording and reproducing system 114. After the cartridge 113 is subjected to the predetermined process, the holding means grasps the cartridge 113 and is returned to the rightward position, thereby taking out the cartridge 113 from the system 114, and then the movable member 111 is moved to the discharge conveyor 115 to place the cartridge 113 thereon.

However with the automatic cartridge loading-and-unloading device described above, it is difficult to sufficiently improve the working efficiency of the recording and reproducing system. That is, assuming that, for the purpose of simplification, the distance between the supply conveyor 112 and the recording and reproducing system 114 is equal to the distance between the recording and reproducing system 114 and the discharge conveyor 115, the distance being represented by a, and the stroke of the holding means 110 is represented by b, the moving distance L of the holding means 110 over which the holding means 110 must be moved to unload the magnetic disk cartridge 113 from the system 114, to transfer the cartridge 113 to the discharge conveyor 115 and to load the next cartridge 113 in the system 114 is as represented by the following formula.

$$L = b + a + 2b + 2a + 2b + a + b = 4a + 6b$$

Assuming that a=15 cm, b=20 cm, and the speed of lateral movement of the holding means 110 and the speed of vertical movement of the holding means 110 (that is, the speed of movement of the movable member 111) are both 10 cm/sec, the moving distance L is 180 cm and the time required for the holding means 110 to travel over the distance L is 18 seconds. Further, when it is assumed that the time required for the predetermined process in the system 114 is 60 seconds in this case, the working efficiency of the system 114 is only 77% [=60/(60+18)].

The working efficiency may be improved by shortening the distance between the supply conveyor 112 and the discharge conveyor 115. However, even if the discharge conveyor 115 is disposed between the supply conveyor 112 and the recording and reproducing system 114 spaced from each other by the distance a as shown in FIG. 4, the distance L is shortened only by 2a, that is, L=2a+6b, and the working efficiency is merely improved to 80%.

Further, though the working efficiency may be improved by providing a plurality of loading-and-unloading devices so that as soon as one loading-and-unloading device unloads a magnetic disk cartridge from the recording and reproducing system, another loading-and-unloading device loads another cartridge in the system, this substantially adds to the equipment cost.

SUMMARY OF THE INVENTION

In view of the foregoing observations and description, the primary object of the present invention is to provide a magnetic disk cartridge loading-and-unloading device which is capable of substantially improving the working efficiency of the recording and reproducing system and can be manufactured at low cost.

The magnetic disk cartridge loading-and-unloading device for loading a magnetic recording disk cartridge in a recording and reproducing system and unloading it from the recording and reproducing system in accordance with the present invention comprises a movable means, a first and second holding means which are adapted to grasp the magnetic recording disk and are mounted on the movable means near to each other to be moved together with the movable means, and a control means which controls the movable means and the first and second holding means so that the movable means brings the first holding means to a position in which the first holding means grasps a first magnetic disk cartridge supplied by a cartridge supply means, then brings the second holding means to a position in which the second holding means grasps a second magnetic disk cartridge ejected from the recording and reproducing system with the first holding means holding the first magnetic disk cartridge, then brings the first holding means to a position in which the first holding means loads the first magnetic disk cartridge in the recording and reproducing system with the second holding means holding the second magnetic disk cartridge, and brings the second holding means to a position in which the second holding means delivers the second magnetic disk cartridge to a cartridge discharge means.

DESCRIPTION OF THE PREFERRED EMBODIMENTS

Figure 1:
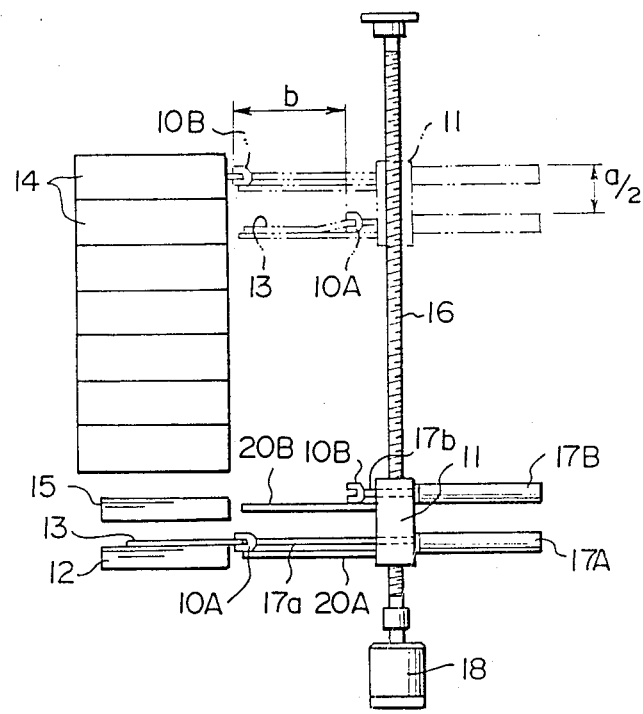
FIG. 1 is a schematic side view showing a magnetic disk cartridge loading-and-unloading device in accordance with a first embodiment of the present invention.

The magnetic disk cartridge loading-and-unloading device in accordance with the first embodiment shown in FIG. 1 is arranged to load a magnetic disk cartridge in a plurality of stacked recording and reproducing systems and to unload it therefrom. In FIG. 1, below the stacked recording and reproducing systems 14 is disposed a cartridge discharge conveyor 15 and below the cartridge discharge conveyor 15 is disposed a cartridge supply conveyor 12. A ball screw 16 is disposed to extend in parallel to the stack of the recording and reproducing systems 14, and a movable member 11 is engaged with the ball screw 16 to be moved up and down in response to rotation of the ball screw 16 under the guidance of a guide means (not shown). The ball screw 16 is driven by an electric motor 18.

First and second holding members 10A and 10B are mounted on the movable member 11 vertically aligned with each other with the former being disposed below the latter. As will be described in detail later, the first and second holding members 10A and 10B are disposed near to each other. The first and second holding members 10A and 10B are respectively fixed to piston rods 17a and 17b associated with air cylinders 17A and 17B fixed to the movable member 11, and are laterally moved by operation of the air cylinders 17A and 17B. Each of the first and second holding members 10A and 10B comprises a pair of catching pieces driven by an air cylinder, solenoid or the like. First and second cartridge supports 20A and 20B are fixed to the movable members 11 respectively below the first and second holding members 10A and 10B. The movable member 11 and the holding members 10A and 10B are operated under the control of a known control means which is not shown.

First it is assumed that none of the stacked recording and reproducing systems 14 is loaded with a magnetic disk cartridge 13. The movable member 11 is first moved downward to bring the first holding member 10A to the level of the magnetic disk cartridge 13 on the cartridge supply conveyor 12. As may be seen from FIG. 1, the second holding member 10B is stopped at the level of the upper surface of the cartridge discharge conveyor 15. At this time, the holding members 10A and 10B are positioned in the rightmost position or the retracted position. Thereafter, the air cylinder 17A is operated to bring the first holding member 10A to the leftmost position or the projected position and the first holding member 10A grasps an end portion of the magnetic disk cartridge 13 on the cartridge supply conveyor 12 (the state shown by the solid line in FIG. 1). The cartridge 13 on the supply conveyor 12 is pushed rightward by a suitable means (not shown) so that the end portion projects from the right side edge of the conveyor 12, thereby facilitating grasping of the end portion by the first holding member 10A. After the first holding member 10A grasps the cartridge 13, the first holding member 10A is returned to the retracted position and the cartridge 13 is placed on the first cartridge support 20A. Then the movable member 11 is moved upward and stopped at a level at which the cartridge 13 held by the first holding member 10A is opposed to a predetermined one of the stacked recording and reproducing systems 14. The first holding member 10A is subsequently moved to the leftmost position and caused to release the cartridge 13, thereby loading the cartridge 13 in the recording and reproducing system 14. The cartridge 13 loaded in the system 14 is subjected to a predetermined process such as checking of the magnetic layer or a predetermined copying process, e.g., initialization.

Thereafter, the first holding member 10A is moved to the rightmost position and then the movable member 11 is moved downward to again bring the first holding member 10A to the level of the magnetic disk cartridge 13 on the cartridge supply conveyor 12. Then the first holding member 10A grasps another magnetic disk cartridge 13. Such a procedure is first repeated until the recording and reproducing systems 14 in the stacks are all loaded with the magnetic disk cartridges 13.

After the systems 14 are all loaded with the cartridge 13, the first holding member 10A grasps another magnetic disk cartridge 13 on the supply conveyor and is moved to the rightmost position to place the cartridge 13 on the cartridge support 20A. Then the movable member 11 is moved upward and stopped, at this time, to a level at which the second holding member 10B is opposed to a predetermined one of the stacked recording and reproducing systems 14. When a cartridge 13 is ejected from the recording and reproducing system 14 after the predetermined process, the air cylinder 17B is operated to move the second holding member 10B to the leftmost position, where the second holding member 10B grasps the ejected cartridge 13 as shown by the chained line in FIG. 1. At this time, the first holding member 10A is held at the rightmost position holding the cartridge 13. After grasping the ejected cartridge 13, the second holding member 10B is moved to the rightmost position, and then the movable member 11 is moved upward by the distance between the first and second holding members 10A and 10B to bring the first holding member 10A to the level at which it is opposed, in place of the second holding member 10B, to the recording and reproducing system 14 from which the cartridge 13 is taken out by the second holding member 10B immediately before. Then the first holding member 10A is moved to the leftmost position to load the cartridge 13 in the recording and reproducing system 14. After the cartridge 13 is loaded in the recording and reproducing system 14, the movable member 11 is moved downward to bring the second holding member 10B to the level at which the cartridge 13 held by the second holding member 10B is positioned at the level of the upper surface of the cartridge discharge conveyor 15. At this level, the second holding member 10B is moved to the leftmost position and is caused to release the cartridge 13, thereby placing the cartridge 13 on the discharge conveyor 15.

Figure 3:
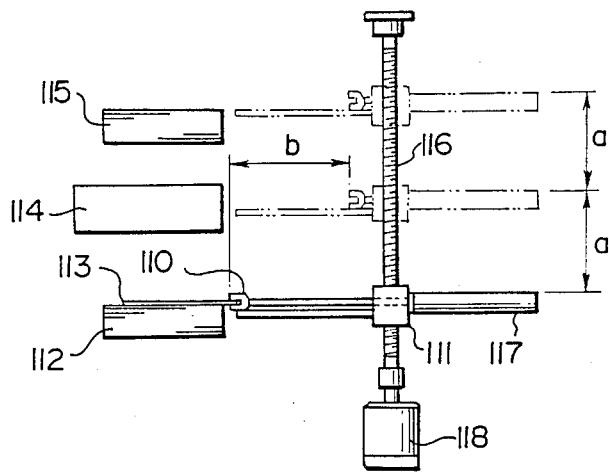
FIG. 3 is a view similar to FIG. 1 but showing a magnetic disk cartridge loading-and-unloading device in accordance with prior art.
Figure 4:
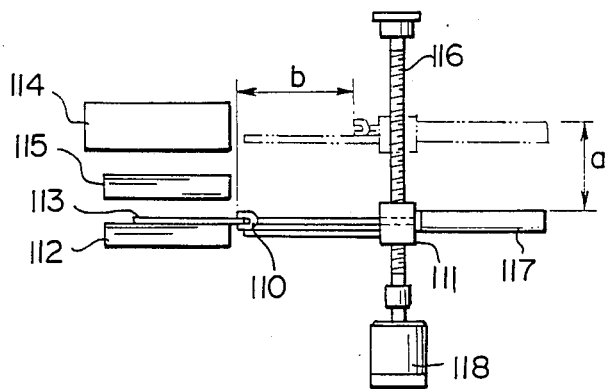
FIG. 4 is a view similar to FIG. 1 but showing another magnetic disk cartridge loading-and-unloading device in accordance with prior art.

As can be understood from the description above, after the processed cartridge 13 is unloaded from the recording and reproducing system 14, another cartridge 13 can be immediately loaded in the system 14 by moving the movable member 11 only over a distance corresponding to the distance between the first and second holding members 10A and 10B, thereby substantially shortening the idle-time of the recording and reproducing system 14. That is, when it is assumed that the stroke of the first and second holding members 10A and 10B is b and the distance between the first and second holding members 10A and 10B is a/2, the distance L over which the first holding member 10A or the second holding member 10B must be moved to unload the cartridge 13 from the recording reproducing system 14 and to load another cartridge 13 in the recording and reproducing system 14 is equal to a/2+2b. That is, in this case, the working efficiency of the recording and reproducing system 14, as calculated in the manner described above in conjunction with the prior art devices shown in FIGS. 3 and 4, is about 93% and is substantially improved as compared with 80% in the case of the device shown in FIG. 4.

As will be apparent to those skilled in the art, the working efficiency of the recording and reproducing system 14 improves in proportion as the distance between the first and second holding members 10A and 10B is shortened. However, the working efficiency will in all cases be better than the prior art devices shown in FIGS. 3 and 4 so long as the distance between the first and second holding members 10A and 10B is sufficiently short as compared with the sum of the distances between the recording and reproducing system and the cartridge discharge position, between the cartridge discharge position and the cartridge supply position, and between the cartridge supply position and the recording and reproducing system. Accordingly, in this specification, the statement that the first and second holding members 10A and 10B are near to each other means that the distance between the first and second holding members 10A and 10B is sufficiently short as compared with the sum of said distances.

Though in this embodiment, the recording and reproducing systems 14 are arranged in a single stack and the cartridges 13 are loaded in the systems 14 with a single movable member, the recording and reproducing systems 14 may be in a plurality of stacks and a plurality of movable members may be provided in a horizontal row with one movable member opposed to each stack of the recording and reproducing systems 14. In this case, the movable members may be arranged to move up and down all together, or may be arranged to move up and down independently from each other.

Figure 2:
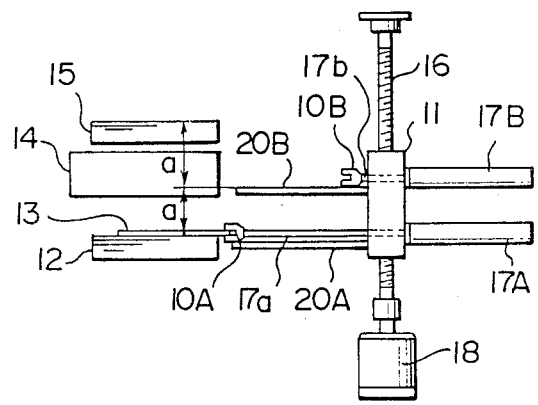
FIG. 2 is a schematic side view showing a magnetic disk cartridge loading-and-unloading device in accordance with a second embodiment of the present invention.

A second embodiment of the present invention will be described with reference to FIG. 2, hereinbelow. In FIG. 2, the parts analogous to the parts shown in FIG. 1 are given the same reference numerals and will not be described here. In this embodiment, the cartridge supply conveyor 12 are disposed below a single recording and reproducing system 14 and the cartridge discharge conveyor 15 is disposed above the recording and reproducing system 14. The vertical distance between the cartridge entrance of the recording and reproducing system 14 and the cartridge supply conveyor 12 is equal to that between the cartridge entrance and the cartridge discharge conveyor 15, and is equal to the distance between the first and second holding members 10A and 10B.

In this embodiment, the second holding member 10B grasps the cartridge 13 ejected from the recording and reproducing system 14 and is returned to the rightmost position. Then the movable member 11 is moved upward to bring the first holding member 10A to the level at which the next magnetic disk cartridge 13 which has been taken from the supply conveyor 12 and held by the first holding member 10A is positioned at the level of the cartridge entrance of the recording and reproducing system 14, and the first holding member 10A is moved to the leftmost position to load the next cartridge 13 in the recording and reproducing system 14. At the same time, the processed cartridge 13 which has been held by the second holding member 10B and is moved to the level of the cartridge discharge conveyor 15 in response to the movement of the next cartridge 13 to the level of the cartridge entrance of the system 14 is placed on the cartridge discharge conveyor 15 by moving the second holding member 10B to the leftmost position.

In the second embodiment, when it is assumed that the stroke of the first and second holding members 10A and 10B is b and the distance between the first and second holding members 10A and 10B is a, the distance L over which the first holding member 10A or the second holding member 10B must be moved to unload the cartridge 13 from the recording reproducing system 14 and to load another cartridge 13 in the recording and reproducing system 14 is equal to a+2b. That is, in this case, the working efficiency of the recording and reproducing system 14, as calculated in the manner described above in conjunction with the prior art devices shown in FIGS. 3 and 4, is about 92% and is substantially improved as compared with 77% in the case of the device shown in FIG. 3.

Though in the embodiments described above, the movable member 11 is arranged to be moved in the vertical direction, the movable member 11 may be arranged to be horizontally moved by horizontally arranging the cartridge supply position, the recording and reproducing system and the cartridge discharge position.

I claim:

1. A magnetic disk cartridge loading-and-unloading device for loading magnetic recording disk cartridges in a recording and reproducing system and unloading them from the recording and reproducing system comprising, first and second holding means adapted to grasp the magnetic recording disk cartridges, a movable means for moving said first and second holding means, said first and second holding means being mounted close to each other and being movable together with the movable means, and a control means for controlling the movable means and the first and second holding means so that the movable means brings the first holding means to a position in which the first holding means grasps a first magnetic disk cartridge supplied by a cartridge supply means for supplying said cartridges to said device, then brings the second holding means to a position in which the second holding means grasps a second magnetic disk cartridge ejected from the recording and reproducing system with the first holding means holding the first magnetic disk cartridge, then brings the first holding means to a position in which the first holding means loads the first magnetic disk cartridge in the recording and reproducing system with the second holding means holding the second magnetic disk cartridge, and brings the second holding means to a position in which the second holding means delivers the second magnetic disk cartridge to a cartridge discharge means for discharging said cartridges from said device while bringing the first holding means to a position in which the first holding means can take out a third magnetic disk cartridge from the cartridge supply means.

2. A magnetic disk cartridge loading-and-unloading device for loading magnetic recording disk cartridges in a recording and reproducing system, and unloading them from the recording and reproducing system, comprising a movable means for moving first and second holding means which are adapted to grasp the magnetic recording disk cartridges and are mounted on the movable means near to each other to be moved together with the movable means, and a control means for controlling the movable means and the first and second holding means so that the movable means brings the first holding means to a position in which the first holding means grasps a first magnetic disk cartridge supplied by a cartridge supply means for supplying said first magnetic disk cartridge to said device, then brings the second holding means to a position in which the second holding means grasps a second magnetic disk cartridge ejected from the recording and reproducing system with the first holding means holding the first magnetic disk cartridge, then brings the first holding means to a position in which the first holding means loads the first magnetic disk cartridge in the recording and reproducing system with the second holding means holding the second magnetic disk cartridge, and brings the second holding means to a position in which the second holding means delivers the second magnetic disk cartridge to a cartridge discharge means for discharging said cartridges from said device, wherein said cartridge supply means, the recording and reproducing system and the cartridge discharge means are vertically aligned with each other in this order from the bottom, and in which the device is characterized in that the second holding means takes out a second magnetic disk cartridge from the recording and reproducing system at the same time that the first holding means takes out a first magnetic disk cartridge from the cartridge supply means, and the second holding means delivers the second magnetic disk cartridge to the cartridge discharge means at the same time that the first holding means delivers the first magnetic disk cartridge to the recording and reproducing system.

* * * * *